United States Patent
Yong et al.

(10) Patent No.: US 9,489,788 B1
(45) Date of Patent: Nov. 8, 2016

(54) LUGGAGE LOCKING DEVICE AND BAGGAGE HANDLING METHOD

(71) Applicant: DigiPas USA, LLC, Avon, CT (US)

(72) Inventors: Ming Hua Yong, Avon, CT (US); Koh Wai Kin, Singapore (SG); Kuu Bi Yong, Singapore (SG); Jim Li Hui Hong, Singapore (SG)

(73) Assignee: DIGIPAS USA, LLC, Avon, CT (US)

( * ) Notice: Subject to any disclaimer, the term of this patent is extended or adjusted under 35 U.S.C. 154(b) by 0 days.

(21) Appl. No.: 14/702,862

(22) Filed: May 4, 2015

(51) Int. Cl.
G05B 19/00 (2006.01)
G07C 9/00 (2006.01)
H04B 5/00 (2006.01)
E05B 65/00 (2006.01)

(52) U.S. Cl.
CPC ....... *G07C 9/00309* (2013.01); *E05B 65/0092* (2013.01); *H04B 5/0025* (2013.01); *G07C 2009/00769* (2013.01)

(58) Field of Classification Search
None
See application file for complete search history.

(56) References Cited

U.S. PATENT DOCUMENTS

| | | |
|---|---|---|
| 3,754,164 A | 8/1973 | Zorzy |
| 4,495,540 A | 1/1985 | Remington et al. |
| 4,931,789 A | 6/1990 | Pinnow |
| 5,153,561 A | 10/1992 | Johnson |
| 5,373,718 A | 12/1994 | Schwerdt et al. |
| 5,489,017 A | 2/1996 | Bonnet |
| 5,640,862 A | 6/1997 | Remenicky |
| 5,689,979 A | 11/1997 | Yu |
| 5,713,226 A | 2/1998 | Yu |
| 5,719,771 A | 2/1998 | Buck et al. |
| 5,847,656 A | 12/1998 | Dawson et al. |
| 5,886,644 A | 3/1999 | Keskin et al. |
| 5,892,441 A | 4/1999 | Woolley et al. |
| 5,894,277 A | 4/1999 | Keskin et al. |
| 6,131,936 A * | 10/2000 | Eguchi et al. ........... 280/33.994 |
| 6,401,889 B1 | 6/2002 | McCleskey |
| 6,411,897 B1* | 6/2002 | Gaspard, II .................. 701/411 |
| 6,483,434 B1 | 11/2002 | UmiKer |
| 6,988,610 B2 | 1/2006 | Fromme et al. |
| 7,021,537 B2 | 4/2006 | Tropp |
| 7,036,728 B2 | 5/2006 | Tropp |
| 8,021,776 B2 | 9/2011 | Habecke |
| 8,079,765 B1* | 12/2011 | Bledsoe et al. ................. 400/62 |

(Continued)

FOREIGN PATENT DOCUMENTS

| | | |
|---|---|---|
| WO | 0019392 A1 | 4/2000 |
| WO | 0125864 A1 | 4/2001 |

(Continued)

*Primary Examiner* — Firmin Backer
*Assistant Examiner* — Nay Tun
(74) *Attorney, Agent, or Firm* — McCormick, Paulding & Huber LLP

(57) ABSTRACT

Disclosed herein is an electronic luggage locking device and airline baggage handling method mainly characterized by ease-of-use, enhanced security and efficiency by utilizing proximity access-gaining and authentication technologies, a plurality of sensors, embedded electronic storage and retrieval of luggage information. The luggage locking device is incorporated with an electronic communication system enables interactions with other sensor modules within the luggage, external smart devices and airline transport systems to form an unitary baggage handling system. The baggage handling system contents a method using application software and capable of indicating and communicating the said luggage information and locational identification within an airline transport systems.

23 Claims, 5 Drawing Sheets

(56) References Cited

U.S. PATENT DOCUMENTS

| | | | |
|---|---|---|---|
| 8,161,781 B2 | 4/2012 | Gokcebay | |
| 8,531,290 B2 | 9/2013 | Ghisani | |
| 8,630,537 B2 | 1/2014 | Kadaba | |
| 8,635,891 B1 | 1/2014 | Tolomei | |
| 2003/0210139 A1* | 11/2003 | Brooks et al. | 340/531 |
| 2004/0012567 A1* | 1/2004 | Ashton | 345/163 |
| 2006/0266563 A1* | 11/2006 | Kaplan | 177/245 |
| 2010/0039252 A1* | 2/2010 | Barkus | 340/521 |
| 2010/0211418 A1* | 8/2010 | Mateer | 705/5 |
| 2011/0054952 A1* | 3/2011 | Mateer | 705/5 |
| 2011/0290875 A1* | 12/2011 | Wengrovitz | 235/384 |
| 2012/0310680 A1* | 12/2012 | Bourla | 705/5 |
| 2013/0162429 A1* | 6/2013 | Pfuhl | 340/539.13 |
| 2013/0241712 A1* | 9/2013 | Motley et al. | 340/10.51 |
| 2013/0264128 A1 | 10/2013 | Plato et al. | |
| 2014/0000138 A1* | 1/2014 | Cable | 40/661.01 |
| 2014/0077952 A1* | 3/2014 | Boss et al. | 340/572.1 |
| 2014/0202829 A1* | 7/2014 | Eberhardt | G01N 35/04 198/341.01 |
| 2015/0029026 A1* | 1/2015 | Brandes | A45C 13/18 340/571 |

FOREIGN PATENT DOCUMENTS

| | | |
|---|---|---|
| WO | 2011149424 A1 | 12/2011 |
| WO | 2013154692 A1 | 10/2013 |

\* cited by examiner

LUGGAGE LOCKING DEVICE AND BAGGAGE HANDLING METHOD

BACKGROUND OF THE INVENTION

1. Field of Invention

The present invention relates to electronic luggage locking devices and, more particularly, pertains to a new method for providing passenger's luggage information to the airline for optimizing its baggage handling system as well as easing of passenger's baggage identification and reclaim.

2. Description of the Prior Art

Luggage zipper combination locks and keyed padlocks are well known as indispensable components of a typical luggage or travel bag providing luggage owner the most basic form of securing personal belongings within the luggage during a trip. However, it's functional and security performances have not been keeping up with changes of modern society especially the emergence of new technologies and having increasing mobile worldwide air travelers. For decades, these 'age-old' combination digit-wheel dial lock and keyed padlocks have become outdated and indisputably cumbersome to use with doubtful security, particularly due to frequently experiencing losing keys, mechanical structure constraining for small wheel-dials, difficult to read tiny engraved-digit size, easily forgotten 3-digits unlocking code, and risk of code being cracked in seconds.

Recent smart luggage known to employ global positioning system (GPS) to locate luggage position. In fact, current commercial GPS technologies are unable to reliably detect an object/item when it is located inside a building or stored in a metal container/truck. For example, satellite signal of automobile GPS navigation system often fails to indicate the direction whenever the car is driven into a tunnel.

In addition to foregoing shortcomings described for those luggage locks, there has been a need for an electronic luggage system operated by an electronic identification device with characteristics as follows: easy and simplicity to use, faster speed to gain access, increased efficiency in accessing luggage information such as its physical dimension, detail contents, weight, luggage owner's name, address and contact information, adjacent safeguard, vicinity notification, and identification of a luggage, airport baggage tracking and locating a luggage, very low battery power consumption, able to conveniently interact with airline and airport systems and relative inexpensive construction.

Present invention is concerned with a smart luggage incorporated with an electronic luggage locking device and intelligent baggage handling system employing sensors and electronic proximity communication technology. In particular, the invention relates to electronic luggage lock and in combination with luggage owner's smart devices and also parties within airline luggage handling systems e.g. an airport and airline facilities, to form an unitary intelligent baggage handling system.

The Author's earlier patent WO 2011149424 A1 disclosed "an electronic combination lock" for luggage which resolves numerous shortcomings associated with when using traditional mechanical locks employing digit-wheel combination wheel-dial locks and keyed padlocks.

The followings additional patents on electronic luggage combination lock, container lock and baggage handling method are believed to have relevance to the invention: U.S. Pat. No. 4,495,540, U.S. Pat. No. 6,401,889 B1, WO 2001025864 A1, U.S. Pat. App. no. 20130264128, WO 2013154692 A1, U.S. Pat. No. 5,713,226 A, U.S. Pat. No. 5,689,979 A, U.S. Pat. No. 5,640,862 A, U.S. Pat. No. 7,021,537 B2, U.S. Pat. No. 7,036,728 B2, U.S. Pat. No. 4,931,789, U.S. Pat. No. 5,021,776, U.S. Pat. No. 3,754,164, U.S. Pat. No. 5,640,862 A, U.S. Pat. No. 8,635,891 B1, U.S. Pat. No. 5,373,718, U.S. Pat. No. 8,161,781 B2, U.S. Pat. No. 5,894,277 A, U.S. Pat. No. 5,886,644 A, U.S. Pat. No. 5,153,561 A, U.S. Pat. No. 8,630,537 B2, U.S. Pat. No. 5,489,017 A, U.S. Pat. No. 5,719,771 A, U.S. Pat. No. 5,892,441 A, U.S. Pat. No. 6,483,434 B1, U.S. Pat. No. 6,988,610 B2, WO 2000019392 A1, U.S. Pat. No. 5,847,656 A, U.S. Pat. No. 8,531,290B2.

However, there are needs to make present traveler's luggage becomes smarter providing greater convenient to the increasingly mobile worldwide travelers for securing a luggage and its contents during a trip while simultaneously ensuring the effectiveness of air transport systems and custom authorized personnel to speedily identify, track and gain access to luggage contents for enhancing air, sea and land travel safety, security and efficiency. To address these weaknesses and pressing needs described in the foregoing, the inventor proposes a smart electronic luggage device and an intelligent baggage handling method which provides the public, air transport institutions e.g. airlines, airports, transport security administration (TSA), international air transport association (IATA) and international civil aviation organization (ICAO) with a useful choice.

SUMMARY OF INVENTION

One aspect of present invention is to provide a luggage locking device and baggage handling method comprising at least an electronic lock, a mechanical housing, a plurality of mechanical rollers, a plurality of sensors and switches, interface application software to interact with other sensors and devices within a luggage and also external paired devices in proximity to the luggage, and remote transport systems with an airline and airports. The luggage system may content and interact with at least an electronic lock having a microcontroller and application software, luggage information electronic storage, electronic luggage tag, a weighting sensor, fingerprint authentication module, adjacent safeguard and warning, vicinity identification and notification sub-system, access to airport facility baggage tracking system. The plurality of electronic modules and application software fit into the physical luggage structure to form an unitary embodiment of an intelligent electronic luggage and when interact in conjunction with external mobile devices such as a smart phone, internet link and/or airport transport systems to form as an efficient and secured baggage handling system.

A further object of present invention is to utilize at least a micro-controller of the luggage lock as the central processing to interact with other devices within the luggage and also external devices in physical proximity, the said microcontroller enables the extraction of various devices information, communicate and finally display on the smart device screen within its physical proximity. Typical information are (i) the physical dimension and weight of a luggage employing strain gauge sensors, (ii) the luggage owner name, address, email and/or mobile phone contact number stored within an electronic tag (iii) proximity access-gaining fingerprint authentication sensor, (iv) adjacent safeguard and warning (v) proximity identification and notification of luggage and (vi) airport baggage tracking and locating for a luggage.

Details of luggage's physical dimension, identity, weight and contents of a luggage are vital information for passenger transport providers such as airline, train and ferry operators to manage the passenger cargo compartment space, weight, as well as for authorized personnel such as custom officers to effectively maintain transport security and safety for travelers. Another object of present invention is to provide an accurate and speedy access to passenger's luggage information enabling efficient operation and optimization of passenger and cargo loading capacity of a flight particularly but not exclusively to budget airlines whereby luggage's space and weight affect aircraft fuel usage and thus operating margin of an airline. Simply restricting each passenger for a specific size and limiting luggage's weight of luggage could not lead to optimization of passenger cargo space utilization in an airplane. An object of present invention is to provide an efficient luggage handling system disclosed herein which enables individual passenger to provide prior luggage physical dimension and weight via smart mobile devices using application software to the airline days or hours ahead before check-in time could potentially lead to efficient planning for airline to optimize passenger cargo loading versus number of seat occupied by passengers within each flight. Incentive could be initiated by airline to those passengers who carry less than assigned luggage's size and weight may promote optimization of aircraft compartment loading factor. Another object of present invention is enable those passengers who are planning to bring larger than airline's assigned size and heavier weight of luggage, application software linking with the airline system could further enable these passengers to purchase at an attractive price days or hours before boarding the airline.

A further object of present invention is to provide an alternative means of access gaining to the luggage locking device utilizing fingerprint authentication. Although human finger is not a dedicated 'tool' to generate a reliable finger print and thus not ideal identification access-gaining method for accessing a lock, its applications have been widely used as an alternative mean. Typical shortcomings on the use of fingerprint to gain access is that human fingerprint pattern changes drastically when subjected to differing external environment. For examples, false negatives access when (i) a cut in the thumb that significantly deforms fingerprint pattern (ii) a wrinkly skin on fingers resulting from prolonged immersion in water of swimming pool or bathtub causes distortion on fingerprint.

Moreover, current invention offers luggage owner the adjacent protection of their luggage to prevent unnecessary anxiety and eliminate the risk of luggage being stolen especially taking meals in airport restaurant, toilet, and etc. After the adjacent safeguard feature is turned on, once the at the luggage sense that the luggage has been displaced or moved, a signal will be sent to luggage owner's pre-paired mobile device to notify the owner with utilizing proximity Bluetooth technology. This invention allows luggage owner to take a nap while waiting flight, train or ferry reassuringly. Apart from that, when travelling with friends or families, multiple luggages are carried and need to take more care of. However, when concentrating on shopping or distract by the attraction, luggages will be forgotten and left off easily, this issue can be averted by using the vicinity Bluetooth, with star network topology, a warning will be sent to the owner if any of the luggages is distance from him/her.

Particularly on the baggage claim conveyor belt system at an airport immediately after disembarkation from a flight, there are similar size, color, design and brand of luggage deceiving luggage owner from picking up correct luggage. Often, only to realize after pulling off other's luggage out from the moving conveyor belt while reading the conventional luggage tag containing written luggage owner's personal information. Another object of present invention is to provide vicinity notification and identification features utilizing near filed communication (NFC) sensor or short-range Bluetooth devices to enable luggage owners through their mobile electronic devices such as smart phone to detect the present of a specific luggage in proximity particularly when the luggage arriving in front of its owner. A further object of present invention is to provide an additional displaying device preprogrammed with unique graphical sign or alphanumeric codes uniquely predefined by the owner on a luggage may be triggered to assist obvious identification of luggage when in close proximity preventing luggage owner from mistakenly removing other's luggage from a moving conveyor during airport baggage claim.

Annually, global airlines continuously mishandled luggage and inflicted unnecessary stressful and gave inconvenience to millions of luggage owners typically generating substantial anxiety while on a holiday trip resulting from a delay or loss of personal belongings in a luggage. Despite many mishandled luggage were returned to its respective owner within the next or a few working days, the damage manifested as unhappy passengers sustained. Global airlines collectively spent over US $3 billions to return the mishandled luggage to their respective owners according to IATA report in 2012. Many luggage also failed to be identified accurately resulting from the loss of its luggage tag which containing owner's details information. A further object of present invention is to embed an electronic tag into a luggage enables the luggage to notify its location remotely whenever it interacts with airport transport facility luggage tracking systems. The notification information enables the missing luggage to be tracked by its owner remotely thus potentially reduces passenger's anxiety for worrying of an eventual loss of the missing luggage hence mitigating customer dissatisfaction to the lowest level.

Present invention thus provides a luggage locking device containing luggage information in electronic storage e.g. in a near field communication (NFC) and radio frequency identification (RFID) microchips, passenger's boarding pass information, electronic luggage tag containing owner's name, address and contact information, weighting sensors, fingerprint authentication module, proximity identification and notification sub-system, airport facility luggage tracking units, advantageously used to replace the use of conventional luggage locks and electronic locks. The invention further effectively provides a modern luggage handling system offering incredibly user's convenient in safeguarding personal belongings as well as offering efficiency in optimizing airline's passenger's cargo and effective tracking and retrieval of essential luggage information wirelessly by authorized personnel enabling the increasing needs for enhanced air transport security and safety resulting from a sustained challenges in air travel security risks over last decade. These and other objects, advantages and features of the invention will be apparent from the following description of a preferred embodiment, considered along with the accompanying drawings.

BRIEF DESCRIPTION OF THE DRAWINGS

The details of the luggage lock device and baggage handling method will be understood more clearly with reference made to the accompanying drawings, in which.

DESCRIPTION OF PREFERRED EMBODIMENTS

Figure 1:
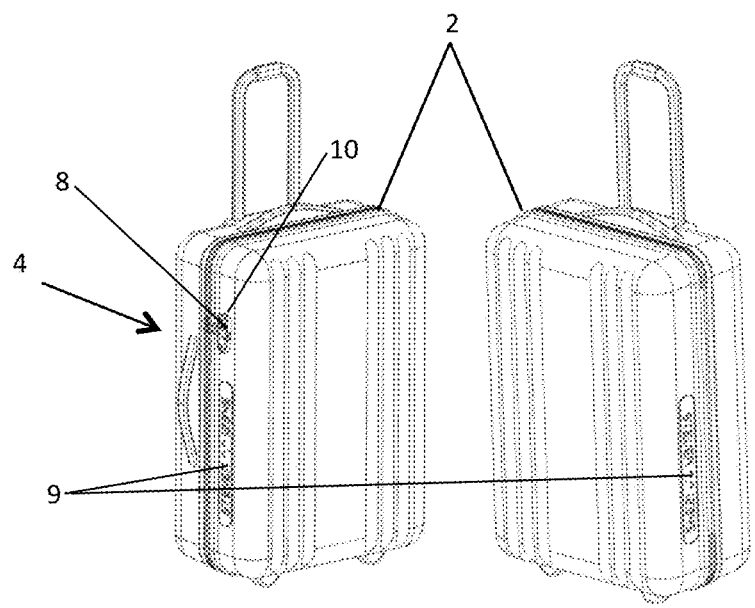
FIG. 1 is an isometric view of a luggage embodiment integral with electronic locking device and a displaying device.
Figure 8:
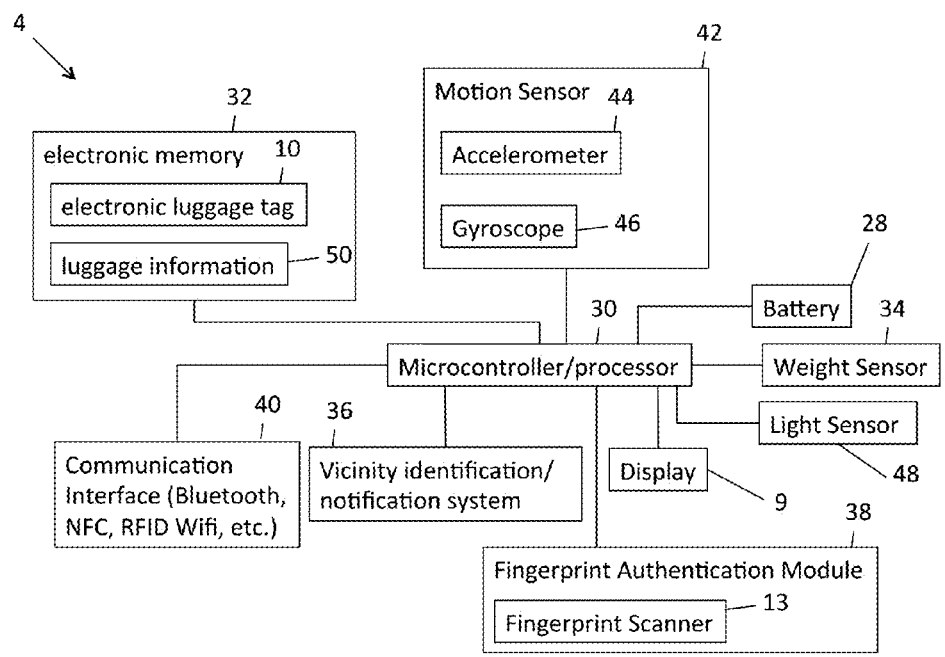
FIG. 8 is an schematic illustration of the electronic locking device and display of FIG. 1 according to embodiments.

FIG. 1 illustrates a luggage 2 integral with an electronic system and locking mechanism 4 including an electronic locking device 8 and a displaying device 9. Referring to FIG. 8, the electronic system and locking mechanism 4 is powered up by a battery 28 and compromises, as part of the electronic locking device 8, at least one microcontroller 30, an electronic luggage tag 10, electronics memory 32, a weighting sensor 34, a vicinity identification and notification sub-system 36 and fingerprint authentication module 38, and the displaying device 9. The electronic locking device 8 may also comprise a communication interface 40, a motion sensor 42 including at least one of an accelerometer 44 or a gyroscope 46, and a light sensor 48. The microcontroller 30 inside the electronics locking device 8 acts as the central processing unit to process information and control the system of electronic locking device 8.

The electronic system and locking mechanism 4 includes the necessary electronics, software, memory, storage, databases, firmware, logic/state machines, microprocessors, communication links, and any other input/output interfaces to perform the functions described herein and/or to achieve the results described herein. For example, the electronic system and locking mechanism 4 may include one or more processors and memory, such as the microcontroller 30 and electronic memory 32, which may include system memory, including random access memory (RAM) and read-only memory (ROM). Suitable computer program code may be provided to the electronic system and locking mechanism 4 for executing numerous functions, including those discussed in connection with the vicinity identification and notification system 36 and the fingerprint authentication module 38. For example, in some embodiments, the vicinity identification and notification system 36 and/or the fingerprint authentication module 38 may include a plurality of computer readable instructions stored in the electronic memory 32 that may be executed and/or accessed by microcontroller 30. In other embodiments, the systems may be stored remotely and executed and/or accessed via one or more remote computing devices, such as a server over a network, as should be understood by those skilled in the art.

The one or more processors, such as the microcontroller 30, may include one or more conventional microprocessors and may also include one or more supplementary co-processors such as math co-processors or the like. The one or more processors may be configured to communicate with other networks and/or devices such as servers, other processors, computers, cellular telephones, tablets and the like.

The one or more processors, including the microcontroller 30, may be in communication with the electronic memory 32, which may comprise magnetic, optical and/or semiconductor memory, such as, for example, random access memory ("RAM"), read only memory ("ROM"), flash memory, optical memory, or a hard disk drive memory. Electronic memory 32 may store the electronic luggage tag 10 and/or luggage information 50 for use by the electronic locking device 8. The memory may also store any other information typically found in computing devices, including an operating system, and/or one or more other programs (e.g., computer program code and/or a computer program product) that are stored in a non-transitory memory portion and adapted to direct the electronic system and locking mechanism 4 to perform according to the various embodiments discussed herein. The information and/or other programs may be stored, for example, in a compressed format, an uncompiled and/or an encrypted format, and may include computer program code executable by the one or more processors, such as the microcontroller 30. The executable instructions of the computer program code may be read into a main memory, such as electronic memory 32, of the one or more processors, such as the microcontroller 30, from a non-transitory computer-readable medium other than the electronic memory 32. While execution of sequences of instructions in the program causes the one or more processors to perform the process steps described herein, hardwired circuitry may be used in place of, or in combination with, executable software instructions for implementation of the processes of the present invention. Thus, embodiments of the present invention are not limited to any specific combination of hardware and software.

For example, the methods and programs discussed herein may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as providing workflow analysis. In an embodiment, an application of executable code may be a compilation of many instructions, which may be distributed over several different code partitions or segments, among different programs, and across several devices.

The term "computer-readable medium" as used herein refers to any medium that provides or participates in providing instructions and/or data to the one or more processors of the electronic system and locking mechanism 4 (or any other processor of a device described herein) for execution. Such a medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Figure 3:
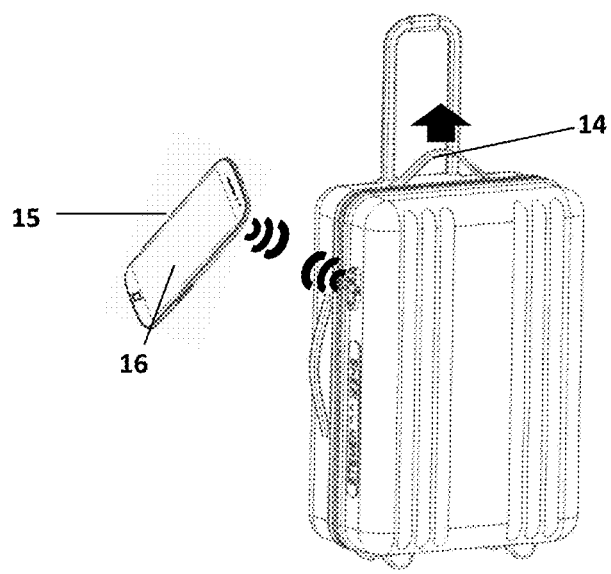
FIG. 3 is an illustration of weighting the luggage weight and the information is transferred to external mobile device.

Referring back to FIG. 1, the displaying device 9 is pre-programmed with graphical sign or alphanumeric codes uniquely predefined by the luggage owner for obvious identification of the luggage 2 when the luggage 2 is in close proximity. As seen in FIG. 3, the information can be further interacted and notified to luggage owner's paired mobile device 15 wirelessly through the communication interface 40, shown in FIG. 8, which may include short-range Bluetooth communication protocol, near field communication ("NFC") protocol, radio frequency identification ("RFID") protocol, WiFi, an infrared sensor with a transceiver for inter devices vicinity communication, or the like to form an unitary system according to an embodiment.

An electronic luggage tag 10 may be embedded inside luggage according to an embodiment, as shown in FIG. 1. The electronic luggage tag 10 is able to store a name, address, contact mobile number and email address. A significant feature of electronic memory 32 is to also store passenger's luggage information 50, which may include the physical dimension and weight of the luggage 2. The information inside both the electronic luggage tag 10 and electronic memory 32 can be read and programmed via near field communication protocol, radio frequency identification protocol or the like. The electronic luggage tag 10 is advantageously eco-friendly, embedded inside luggage lock and will not subject to be torn off easily.

Figure 2:
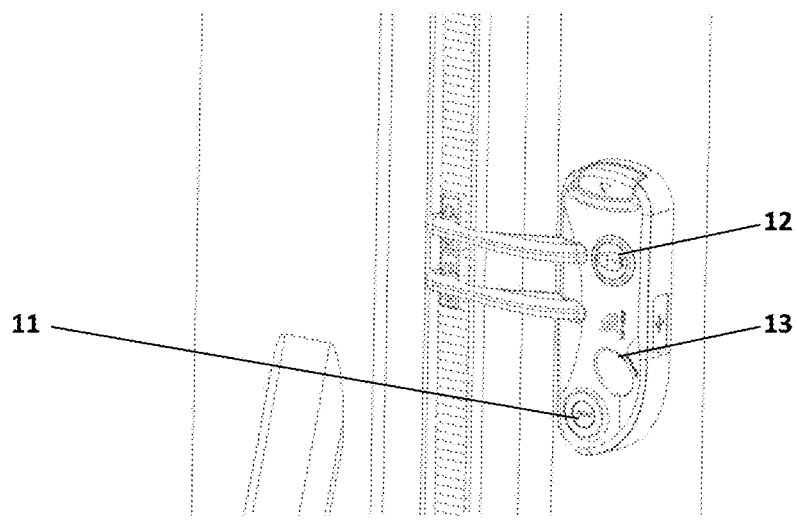
FIG. 2 is a front view of electronic luggage locking device with mechanical key bypass module, button and fingerprint module.

Referring to FIG. 2, the electronic system and locking mechanism 4 may include a mechanical key bypass module 11 in provision of enabling custom personnel to gain access to the luggage content without damaging the locking device 8. A mechanical triggered button 12 provides user interaction with the system. According to embodiments, a fingerprint authentication module 38, including a fingerprint scanner 13, may be included inside the electronic locking device 8 to provide an alternative means for gaining access to the luggage locking device.

Figure 9:
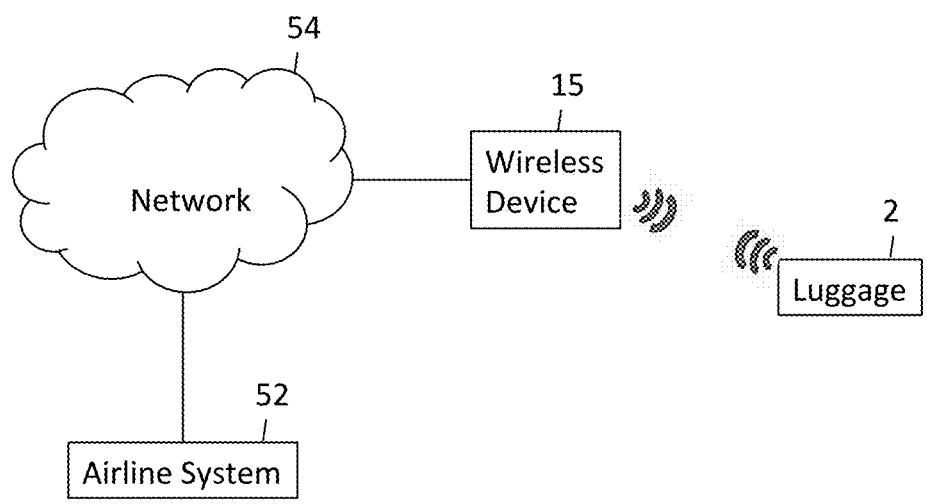
FIG. 9 is a schematic illustration of an information system including the luggage of FIG. 1 according to embodiments.

FIG. 3 shows a weighing system 14 employing the weight sensor 34, such as a strain gauge sensor, enclosed in the luggage according to an embodiment. Weight information, as determined by the weight sensor 34 may be wirelessly extracted with the external mobile device 15. Additionally, other information including passenger's flights information and passenger's luggage information 50 inside the luggage locking device 8 may also be interacted in conjunction with external mobile devices 15. The external mobile device 15 may be a smartphone, a tablet, a personal computer, a smart watch or the like. As seen in FIG. 9, the extracted information from the luggage 2 can be further sent to an airline system 52 through a network connection 54 with an application being executed by the external mobile devices 15 prior to arriving at an airport check-in counter to form an efficient and secured baggage handling method. For example, the weight information may advantageously allow the airline to be able to optimize the airline's cargo space and weight for a particular flight and, additionally, a passenger may be able to get incentives offered by airline for a particular luggage weight less than pre-assigned weight by airline for each passenger. By interfacing the luggage 2 with the airline system 52 through the external mobile device 15, the system of the present invention may advantageously integrate a user's travel and luggage information with details of an airline's particular travel schedule, availability of seats, cargo space, pricing and the like, all of which may be viewed, accessed and interacted with on a display 16 of the external mobile device 15. The application executed by the external mobile device 15 may further provide the ability for purchasing a seat and cargo space any time. Additionally, the boarding pass of an airline's passenger may stored in and/or able to be retrieve from the application on the external mobile device 15.

Figure 4:
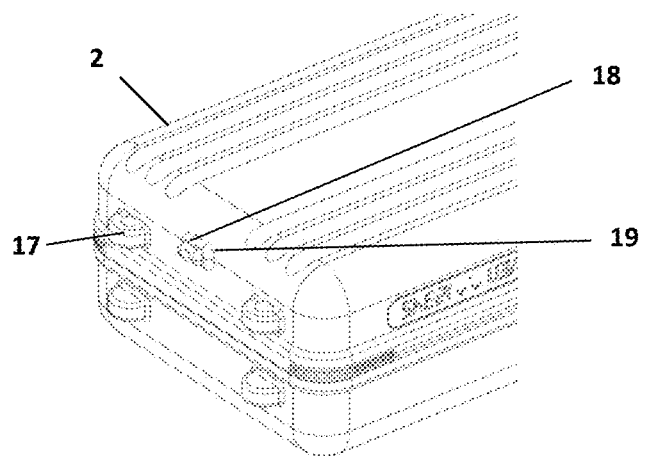
FIG. 4 is a sketch of luggage roller embedded with luggage as an embodiment with uplift pin, mechanical ball, enclosed with rolling sensor for detection of displacement.
Figure 5:
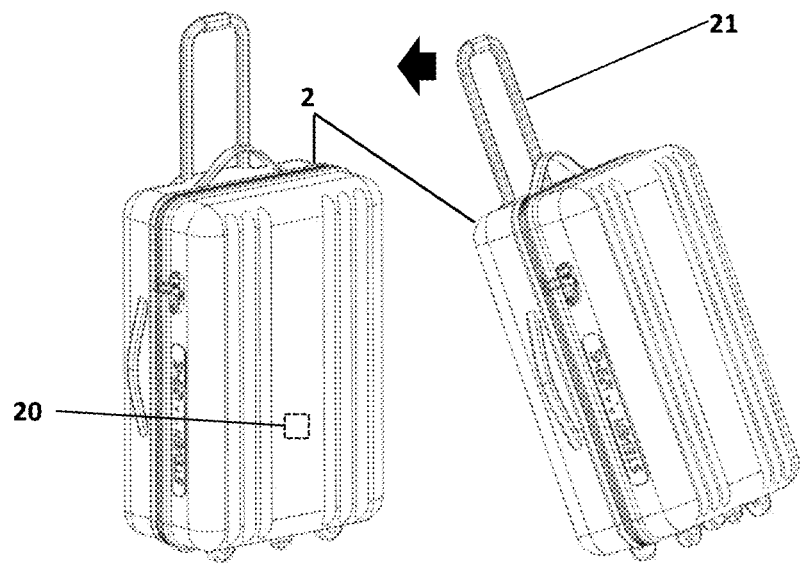
FIG. 5 is an isometric view of a luggage embodiment integrated with electronics motion sensors to detect any translation, movement and displacement.

FIG. 4 demonstrates the luggage 2 with external roller 17 built with an uplift pin 18, mechanical ball and optical light beam sensor 19. FIG. 5 shows the luggage 2 embedded with a multiple of electronics motion sensors 20 such as an accelerometer sensor, e.g. a three-axis accelerometer, gyroscope and the like. The signals from uplift pin 18, mechanical ball, optical light beam sensor 19, shown in FIG. 4, and motion sensor 20, shown in FIG. 5, as well as motion from luggage handle 21 may be sent to the microprocessor 30, shown in FIG. 8, of the electronic locking device 8, shown in FIG. 1, for detection of movement, displacement, and/or translation of the luggage 2. The processed signals from the electronic locking device 8 may then be sent to external mobile device 15, for example, wirelessly as seen in FIG. 3 utilizing proximity Bluetooth technology or the like to provide a warning to the luggage owner that the luggage 2 has been moved. Thus, the present invention may advantageously provide a security system that to reduce the unnecessary anxiety from the luggage owner by eliminating the risk of luggage 2 being stolen.

Figure 6:
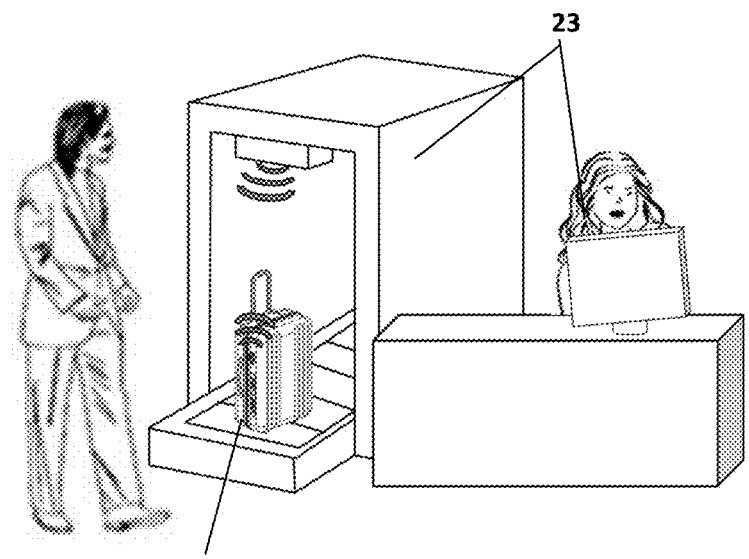
FIG. 6 is an illustration of luggage embodiment interacting and exchanging necessary information with airline's baggage handling system.

FIG. 6 illustrates the luggage 2, according to an embodiment, that interacts and exchanges necessary information when passing through an airline's baggage handling system 23. This may advantageously cut short the passenger's the check-in time.

Figure 7:
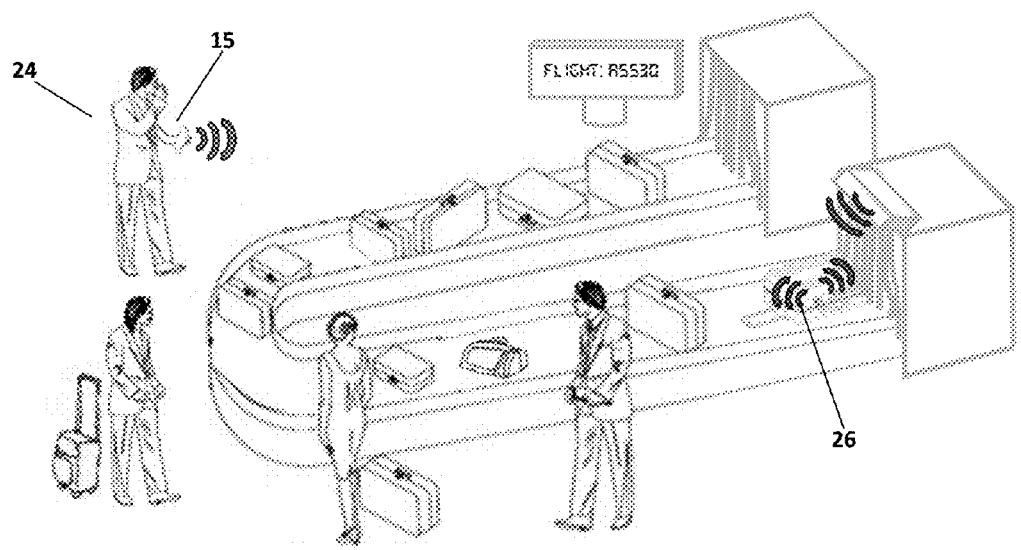
FIG. 7 is an illustration of vicinity notification and identification on luggage's owner mobile devices when particular luggage embodiment is in front of the owner on the baggage claim conveyer belt after disembarkation from a flight.

FIG. 7 shows the owner 24 of a particular luggage 26, which may be in the form of the luggage 2, shown in FIGS. 1-6 and 9, receiving notification on his/her mobile device 15 when the particular luggage 26, according to an embodiment, is in front of the owner 24 after disembarkation from a flight. The notification may be sent wirelessly, for example, by utilizing near field communication (NFC) sensor, RFID sensor, short-range Bluetooth communication protocol or the like. This may aid in preventing the luggage owner 24 from picking up the wrong luggage, which could be of a similar size, color, design and brand of luggage.

The invention has been described with reference to the illustrated preferred embodiments described herein. The invention is not unduly limited by this disclosure of the preferred embodiments described. Instead, it is intended that the invention be defined and their equivalents, set forth in the following claims.

What is claimed is:

1. A luggage locking device comprising:
an electronic lock;
an electronic luggage tag comprising a name, address, contact mobile number and email address;
an electronic memory storing luggage information comprising the physical dimension of a luggage associated with the electronic luggage tag and the contents of the luggage;
a movement sensor;
a processor in communication with the movement sensor, the processor adapted to receive signals from the movement sensor and to generate warnings in response to signals from the movement sensor indicative of detected movement of the luggage locking device;
a weighting sensor;

a proximity access gaining wireless sensor and vicinity identification and notification device;
a communication interface; and
a computer readable medium coupled to the processor, the computer readable medium including a plurality of instructions stored thereon which, when executed by the processor, cause the processor to perform operations comprising:
locking or unlocking the electronic lock;
interacting with the weighting sensor, proximity access gaining wireless sensor and vicinity identification and notification device enclosed within the luggage,
communicating wirelessly with external devices that are wirelessly paired with the luggage through the communication interface, the external devices being external to the luggage and in proximity thereto, and
authenticating the external devices that are wirelessly paired with the luggage through the communication interface and in proximity to the luggage,
wherein the processor, computer readable medium and associated electronic circuits fit into the physical structure of the luggage and interact with the external devices in proximity to and wirelessly paired with the luggage to form a unitary system.

2. The luggage locking device of claim 1, further comprising a near field communication (NFC) device.

3. The luggage locking device of claim 1, further comprising a communication interface configured to allow an airport baggage tracking facility to identify and communicate with the electronic luggage tag.

4. The luggage locking device of claim 1, further comprising a mechanical key bypass module in conformance to the transportation security administration (TSA) enabling custom personnel to gain access to the contents of the luggage without the need to damage the locking device.

5. The luggage locking device of claim 1, further comprising at least an electronic bypass module with provision of electrical wires and wireless interconnects to a handheld electronic device enabling the transportation security administration (TSA) custom personnel to gain access to the contents of the luggage without the need to damage the locking device.

6. The luggage locking device of claim 1, further comprising at least a battery to power the electronic lock, electronic luggage tag, electronic memory, weighting sensor, and proximity access gaining wireless sensor and vicinity identification and notification device and to drive a locking mechanism of the electronic lock.

7. The luggage locking device of claim 1, wherein the communication interface includes a short-range communication device.

8. The luggage locking device of claim 1, further comprising at least an infrared sensor and a transceiver for inter-devices vicinity communication.

9. The luggage locking device of claim 1, further comprising a semiconductor fingerprint authentication module.

10. The luggage locking device of claim 1, further comprising at least a displaying device preprogrammed with graphical sign or alphanumeric codes uniquely predefined by the luggage owner for obvious identification of the luggage when the luggage is in close proximity.

11. The luggage locking device of claim 1, wherein the movement sensor further comprises a roller built with an uplift pin and a rolling sensor for detection of displacement.

12. The luggage locking device of claim 1, wherein the movement sensor further comprises a mechanical ball and optical light beam sensor to detect displacement.

13. The luggage locking device of claim 1, wherein the movement sensor includes an accelerometer sensor or gyroscope to detect movement, displacement, translation or lifting up of the luggage.

14. The luggage locking device of claim 1, wherein the external devices that are wirelessly paired with the luggage through the communication interface include at least one external mobile device; and
wherein the processor, computer readable medium and associated electronic circuits are configured to interact in conjunction with the at least one external mobile device through a network link in accessing a remote airline transport system to form an efficient and secured baggage handling system.

15. The luggage locking device of claim 14, wherein the processor is further configured to interface, through the at least one external mobile device, with an airline system application containing flight information for a passenger associated with the luggage to enable the luggage information stored in the electronic memory to be sent to an airline prior to the passenger arriving at an airport check-in counter.

16. The luggage locking device of claim 15, wherein the passenger's luggage information includes at least luggage dimension and weight, luggage owner's name, residence address, mobile phone number, and an email address.

17. The luggage locking device of claim 14, wherein the processor is further configured to interface, through the at least one external mobile device, with an airline system application containing flight information for a passenger associated with the luggage to enable the luggage weight stored in the electronic memory to be sent to an airline prior to the passenger arriving at an airport check-in counter.

18. The luggage locking device of claim 1, wherein the plurality of instructions stored on the computer readable medium provides a provision for a passenger to interface with details of an airline's particular travel schedule, availability of seat, cargo space and pricing.

19. The luggage locking device of claim 18, wherein the plurality of instructions stored on the computer readable medium provides provisions for a passenger to purchase a seat and cargo space anytime at a price.

20. The luggage locking device of claim 1, wherein the plurality of instructions stored on the computer readable medium provides provisions for a passenger to collect incentives offered by an airline for a particular luggage weight less than pre-assigned weight by airline for each passenger.

21. The luggage locking device of claim 1, wherein the computer readable medium contains the information as in the boarding pass of an airline's passenger.

22. The luggage locking device of claim 1, wherein the external devices that are wirelessly paired with the luggage through the communication interface include at least a smartphone, a tablet, a personal computer or a smart watch.

23. A baggage handling system comprising:
an airline system processor;
a first electronic memory coupled to the airline system processor; and
an airline system application stored in the electronic memory and including a plurality of instructions which, when executed by the airline system processor, cause the airline system processor to perform operations comprising:
optimizing an airline's cargo space and weight for a particular flight by requesting each passenger to provide luggage information including an estimated luggage weight and precise luggage dimension to the airline days or hours before arriving at an airport for boarding;

wherein the luggage information is provided by at least one wireless device wirelessly interfacing with at least one luggage, the at least one luggage comprising:

a processor;

a second electronic memory coupled to the processor, the second electronic memory storing an electronic luggage tag comprising a name, address, contact mobile number and email address and luggage information including a physical dimension of the luggage;

a movement sensor in communication with the processor;

an electronic lock in communication with the processor;

a weight sensor in communication with the processor; and a proximity access wireless sensor in communication with the processor for the detection and notification of wireless devices in a vicinity of the luggage;

wherein the processor is adapted to receive signals from the movement sensor and to generated warnings in response to signals from the movement sensor indicative of detected movement of the at least one luggage.

\* \* \* \* \*